United States Patent [19]
Bublies et al.

[11] Patent Number: 6,129,367
[45] Date of Patent: Oct. 10, 2000

[54] AXLE SUSPENSION FOR RIGID AXLES IN VEHICLES

[75] Inventors: Holger Bublies, Osnabrück; Reinhard Buhl, Bohmte; Uwe Cossmann, Tecklenburg, all of Germany

[73] Assignee: Zf Lemförder Metallwaren AG, Germany

[21] Appl. No.: 09/093,015

[22] Filed: Jun. 5, 1998

Related U.S. Application Data

[63] Continuation-in-part of application No. 08/696,972, filed as application No. PCT/DE96/00926, May 29, 1996, abandoned, and a continuation of application No. PCT/DE98/01269, May 7, 1998.

[30] Foreign Application Priority Data

Jun. 16, 1995 [DE] Germany ............................ 195 21 874

[51] Int. Cl.⁷ .................................................. B60G 9/02
[52] U.S. Cl. ............................ 280/124.107; 280/124.116; 180/349
[58] Field of Search ..................... 280/124.107, 124.116, 280/FOR 146, FOR 170, FOR 182; 180/349, 352, 378

[56] References Cited

U.S. PATENT DOCUMENTS 2,300,844  11/1942  Olley ................................ 280/124.116

FOREIGN PATENT DOCUMENTS

| | | |
|---|---|---|
| 430368 | 6/1991 | European Pat. Off. . |
| 92 18 307 | 1/1994 | Germany . |
| 1-95919 | 4/1989 | Japan ............................ 280/FOR 182 |
| 3-99915 | 4/1991 | Japan . |
| 873877 | 8/1961 | United Kingdom ................... 180/349 |
| 1477992 | 6/1977 | United Kingdom . |

*Primary Examiner*—Peter C. English
*Attorney, Agent, or Firm*—McGlew and Tuttle, P.C.

[57] ABSTRACT

An axle suspension for rigid axles in vehicles, especially utility vehicles, with longitudinal control arms extending in the longitudinal direction of the vehicle and connecting the vehicle axle to the vehicle body in a vertically movable manner. The longitudinal control arms are arranged for axle guiding on each side of the vehicle approximately at the same level. A four-point torsional connecting element is articulated to the vehicle axle, on the one hand, and to the vehicle body, on the other hand. The four-point torsional connecting element is arranged above the vehicle axle and is connected as a flexible cross to the vehicle axle and to the vehicle body via two body and axle joints located at spaced locations from one another in the transverse direction of the vehicle. The arms of the four-point connecting rod are designed in whole as a one-piece forged part and are girders subject to bending with an approximately rectangular cross section. One of the arms has a predetermined breaking point.

19 Claims, 2 Drawing Sheets

AXLE SUSPENSION FOR RIGID AXLES IN VEHICLES

This is a continuation in part application of U.S. patent application Ser. No. 08/696,972 filed Aug. 26, 1996, which is hereby incorporated by reference and is now abandoned. U.S. patent application 08/696,972 was PCT National Stage Application of PCT/DE96/00926 filed May 29, 1996, and claiming priority from German Patent Application DE 19521874 filed Jun. 16, 1995. This present application is also a continuation of PCT International Application PCT/DE98/01269 filed May 7, 1998 designating the United States of America.

FIELD OF THE INVENTION

The present invention pertains to an axle suspension for rigid axles in vehicles, especially in commercial vehicles. One longitudinal connecting rod connecting the vehicle axle and the vehicle body in a vertically movable manner and extending in a longitudinal direction of the vehicle is arranged on either side of the vehicle approximately at the same height. A multiple connecting rod, which is offset in terms of height, is connected by means of joints, with the vehicle axis and with the vehicle body and includes a stabilizing device which actively opposes lateral rolling and tilting motions by means of torsional stresses for guiding the axle.

BACKGROUND OF THE INVENTION

Axle suspensions have become known which comprise an axle guided by means of longitudinal connecting rods, which are arranged on both sides of the vehicle and are coupled, on the one hand, to the vehicle axle, and on the other hand, to the vehicle body, in conjunction with a triangular connecting rod, which is, on the one hand, usually anchored to the vehicle axle in the center of the vehicle with a central joint, and on the other hand, is coupled to the vehicle body with the ends of its two struts. Such a design is apparent, e.g., from German Patent Document G 92 18 307.7. As is well known, this triangular connecting rod axle suspension is combined with a stabilizing bar, which is usually U-shaped in the top view, whose angular side ends are attached to the vehicle body at a lateral distance from one another in a limited universal joint manner and whose web section is mounted in a movable manner in at least two stabilizing bearings on the vehicle axle about a transverse axis to the longitudinal direction of the vehicle. This stabilizing bar is used for the transverse stabilization of the axle suspension.

In addition, an axle suspension has become known from Japanese Patent Document JP 64-3-9915, in which two longitudinal connecting rods are coupled under the rear vehicle axle via molecular joints, on the one hand, and on the other hand, these connecting rods are attached to the vehicle body. Two longitudinal connecting rods, which are connected via a transverse strut, are additionally arranged in this prior-art embodiment approximately in the center of the axle. However, it is disadvantageous in such an axle suspension that the tendency of the vehicle to roll cannot be sufficiently compensated for. Due to the centrally arranged transverse strut between the longitudinal connecting rods, such a design is not rigid in terms of torsion and is not able to guarantee any sufficient transverse stability.

SUMMARY AND OBJECT OF THE INVENTION

The basic technical object of the present invention is to optimize a prior-art axle suspension in terms of weight and stability and at the same time to increase the reliability of righting of the axle suspension.

In the axle suspension of the present invention, longitudinal connecting rods connect the axle of the vehicle with a vehicle body in a vertically movable manner. The longitudinal connecting rods extend in a longitudinal direction of the vehicle and are arranged on either side of the vehicle. A torsional connecting element includes first and second body joints pivotally connecting the torsional connecting element to the vehicle. The first and second body joints are spaced apart from one another in a transverse direction of the vehicle. The torsional connecting element also includes first and second axle joints pivotally connecting the torsional connecting element to the axle. The first and second axle joints are spaced apart from one another in a transverse direction of the vehicle. The first body and axle joints are positioned on a first side of the vehicle, and the second body and axle joints are positioned on a second side of the vehicle. The first and second sides of the vehicle are diametrically opposite. The torsional connecting element includes a first arm with one end connected to the first body joint and another end connected to the second axle joint. The torsional connecting element also includes a second arm with one end connected to the second body joint and another end connected to the first axle joint. The arms of the four-point torsional connecting element or rod are designed in whole, as a one-piece forged part and are girders subject to bending with an approximately rectangular cross section. One of the arms has a predetermined breaking point.

Reference is first explicitly made to the features described in the patent application Ser. No. 08/696,972 as they appear especially from FIGS. 1 through 10 contained therein and the corresponding description. These features are part of this application. For example, there is an idea that an axle suspension according to application Ser. No. 08/696,972 can be combined with the present invention. The four-point connecting rod connected above the vehicle axle to the vehicle axle, on the one hand, and to the vehicle body, on the other hand, is designed according to the present invention as a flexible cross and is connected to the vehicle axle, on the one hand, and to the vehicle body, on the other hand, via two joints located at spaced locations from one another in the transverse direction of the vehicle. The arms of the four-point connecting rod, which is made as a whole as a one-piece forged or cast part, are designed as girders subject to bending with an, e.g., round, approximately rectangular or similar cross section.

According to the present invention, one of these arms has a predetermined breaking point, which is advantageously provided on one of the axle-side arms, so that no additional manufacturing expense is needed for this. In the area of the predetermined breaking point, the arm has a cross section that is larger, taking the specified safety factor into account, than the cross section necessary for the expectable loads of the four-point connecting rod. One essential advantage of the present invention is that even in the case of axle loads far exceeding the expectable maximum requirements and the destruction of the four-point connecting rod that could possibly be associated with this, the destruction would first take place in the area of the predetermined breaking point and consequently in a controllable manner. However, axle guiding is still guaranteed according to the present invention even in such an extreme case, because one of the two arms of the four-point connecting rod is still fastened to the vehicle axle, so that the vehicle can be driven to the nearest repair shop, e.g., without external support.

A special advantage of the design according to the present invention is the possibility of using already existing joint connections and to substitute a single four-point connecting rod according to the present invention for a plurality of axle guiding elements (longitudinal control arms) according to the state of the art. In an axle suspension according to the present invention, it is possible to determine the tendency of the vehicle to roll in a very simple manner and accurately, so that the four-point connecting rod can be designed optimally while optimizing its weight at the same time. Markedly stronger forces and torques can be absorbed with a four-point connecting rod according to the present invention compared with prior-art designs. Along with this, the axle suspension according to the present invention is compact compared with prior-art designs, because it has a smaller number of individual parts and requires less assembly work.

Additional embodiments of the present invention are the subject of the subclaims.

Thus, it is suggested that the joints be designed, e.g., as ball joints with an elastomer arranged between the joint housing and the ball piece. These molecular joints can be correspondingly adapted to the loads to be expected by selecting an elastomer with a corresponding Shore hardness. In addition, recesses, which influence the characteristics of the joint in a specific manner, may be provided within the elastomer and/or the housing and on the inner part of the joint. For example, the molecular joints may have a lower damping in one direction and a higher damping in at least one direction that is offset thereto. Besides the above-described ball joints, other types of joints, e.g., pivot joints or other types are, of course, also conceivable for this application.

The idea according to the present invention is especially to design the joints and the four-point connecting rods receiving same as a modular system with individual parts that can be interchanged corresponding to the loads. It is thus possible to coordinate joints and four-point connecting rods with one another, depending on the customers' requirements. The joints are provided for this purpose with a standard external diameter and the joint mounts of the arms of the four-point connecting rod with standardized internal diameters. Thus, the molecular joints and the metallic basic body of the four-point connecting rod offer cumulative opposing forces to the forces introduced via the xle.

Other preferred embodiments of an axle suspension according to the present invention for rigid axles in vehicles provide for a stabilizing torque between 10 and 60 kNm but preferably between 40 and 50 kNm for the four-point connecting rod, a distance of 300 to 700 mm but preferably about 500 mm for the vehicle body-side joints of the four-point connecting rod, a distance of 300 to 700 mm but preferably about 350 mm for the vehicle axle-side joints of the four-point connecting rod, and a distance of 300 to 1,000 mm but preferably about 550 mm between the vehicle body-side and vehicle axle-side joints of the four-point connecting rod.

On the whole, an axle suspension according to the present invention provides a compact system, which meets the requirements on heavy and very heavy utility vehicles, whose special advantages are a four-point connecting rod which can be combined in a flexible manner and meets the highest safety requirements. Furthermore, for the first time ever, it has become possible with an axle suspension according to the present invention to achieve a passive roll steer effect in a specific manner due to the geometrically determinable arrangement of the center of rotation of the four-point connecting rod, corresponding to the position of the crossing point of the arms. This leads to advantages, e.g., improved steering target behavior, improved load change behavior, reduced tire wear, and a reduction in the load on the components of the chassis due to overdetermined statics being avoided. Due to the four-point connecting rod being arranged above the vehicle axle, there is an increased ground clearance, which is of considerable significance, e.g., in the case of vehicles used on construction sites.

The above-mentioned features of the present invention and the features yet to be explained may, of course, be used not only in the combination described, but also in ombinations or alone without leaving the scope of the present invention.

The four-point connecting rod preferably has a torsional cross design with a defined characteristic curve for torsional stress produced by the torsion. Two cross arms of the four-point connecting rod are preferably connected to the vehicle body by means of ball-and-socket joints and two cross arms of the four-point connecting rod are preferably connected to the vehicle axle by means of ball-and-socket joints.

The four-point connecting rod may be provided as a plane load-bearing structure with a defined characteristic curve for torsional stress produced by torsion. The four-point connecting rod may also be designed as a torsional framework construction with a defined characteristic curve for torsional stresses produced by the torsion.

An integration in one component of the elements for guiding the axle and of the elements for the transverse stabilization of the vehicle body against the vehicle axle is achieved by means of these embodiment features. The torsional connecting element is arranged directly between the longitudinal connecting rods to guide the axle and is coordinated with these longitudinal connecting rods to rotate in unison, transversely to the longitudinal direction of the vehicle, but in a cardanically movable manner by means of friction-free bearing elements, which are known per se. A special advantage of the design according to the present invention is that axle guide elements, which have already been installed, are able to be replaced with an axle suspension designed according to the present invention by means of using the bearing elements available on the vehicle body and on the vehicle axle.

In addition, it is possible to determine the roll stability very precisely in an embodiment of an axle suspension according to the present invention, and greater forces and torques can be absorbed compared with prior-art embodiments.

Separate space for storing a torsional connecting element is no longer necessary. The bearing elements for the torsional connecting element are omitted on the vehicle axle as well as on the vehicle body. In addition to this, the axle suspension according to the present invention is cost-effective compared to prior-art embodiments since it has fewer individual components and requires less mounting work.

However, there are also functional advantages. The torsional connecting element may be used as a straight bar, such that the cost of its manufacture is also reduced.

In a preferred embodiment, each of the ends of the torsional connecting element, which is designed as a torsion bar, and ends of the longitudinal connecting rods are connected at two places against the longitudinal direction of the vehicle, but in a movable manner, so that the torsional connecting element can rotate in unison with the longitudinal connecting rod, on the one hand, but which can be designed as sufficiently movable in the transverse direction of the vehicle, on the other hand. The arrangement of the torsional connecting element between the longitudinal connecting rods for guiding the axle may be carried out at any place between the couplings of the longitudinal connecting rods to the vehicle axle and the couplings of the longitudinal connecting rods to the vehicle body. However, it is also possible to combine the connection of the torsional connecting element with the longitudinal connecting rods for guiding the axle with their bearings on the vehicle axle.

The above-mentioned features of the present invention and the features yet to be explained may, of course, be used not only in the combination described, but also in combinations or alone without leaving the scope of the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
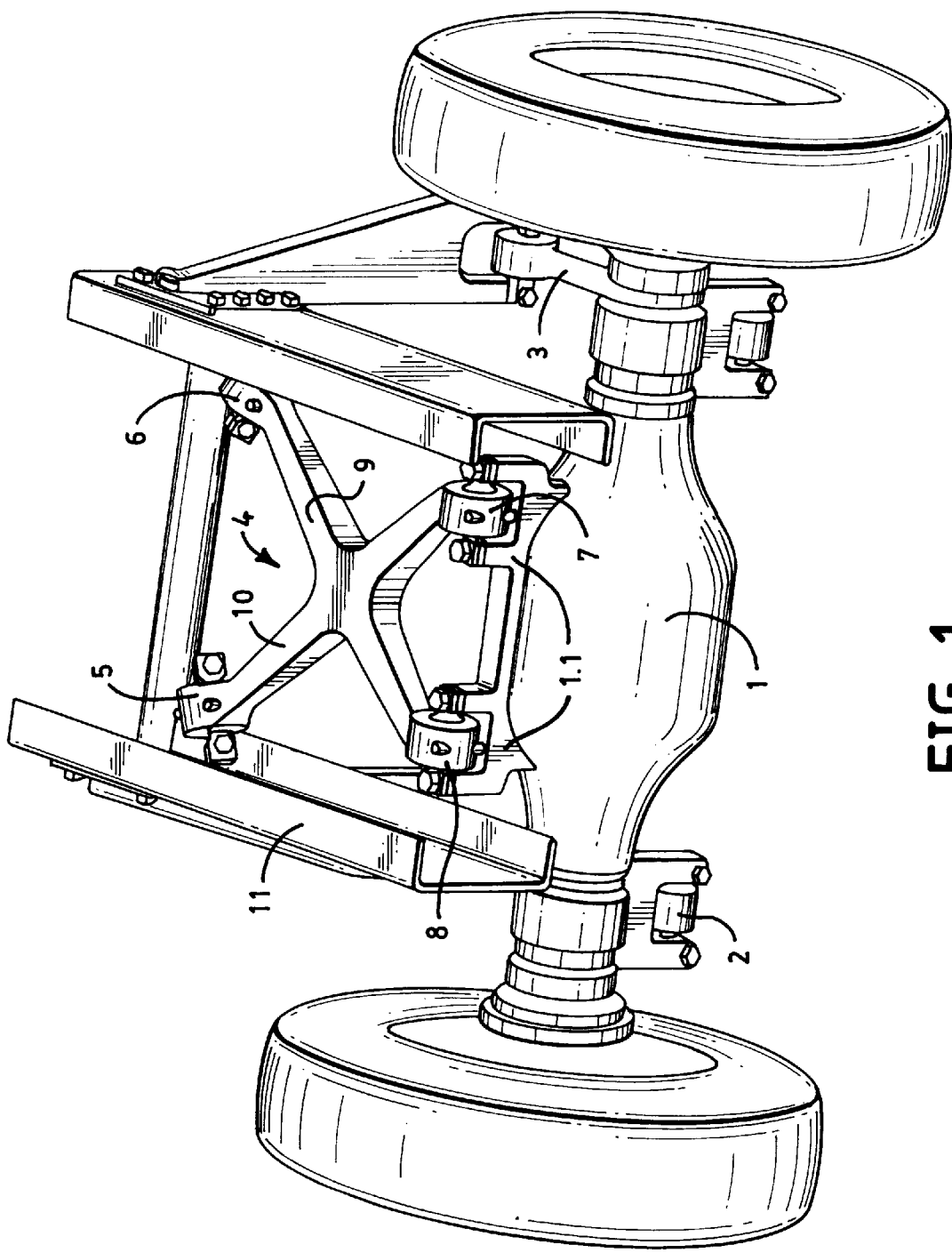
FIG. 1 is a view of a three-dimensional arrangement of an axle suspension according to the present invention.

Referring to the drawings, in the exemplary embodiment, the vehicle axle 1 is connected to the vehicle body by longitudinal control arms 2 and 3 at a considerable distance from the longitudinal center of the vehicle and on both sides of the vehicle. A four-point torsional connecting rod or element 4 is arranged above the vehicle axle in the middle of the vehicle. In the embodiment shown, the connection of the vehicle axle to the vehicle is such that the vehicle axle can perform rolling movements, i.e., movements around an axis located in the longitudinal axis of the vehicle, of +60 depending on the driving circumstances.

Some areas of the vehicle body are shown schematically in FIG. 1. The connection of the four-point connecting element to the vehicle chassis 11 is shown in FIG. 1. The joint connections of the longitudinal control arms 2 and 3 are located under the vehicle axle 1, while the four-point connecting element 4 is arranged above the vehicle axle 1 at a level that is different from that of the longitudinal control arms 2 and 3. All joint connections are designed as cardanically movable connections and consist of molecular joints with an elastomer 13 arranged between a joint housing 14 and a ball piece 15.

The four-point connecting element 4 comprises two stable arms 9 and 10 in a mutually crossing arrangement and is designed as a one-piece forged or cast part with approximately rectangular cross section. Its torsion obeys a defined characteristic. The 20 cross section of the arms can be dimensioned in a simple manner according to the following formula at a preset section modulus "W:" $W = b\,h^2/6$. Here, "b" is the width and "h" is the height of the cross section of the arm.

Figure 2:
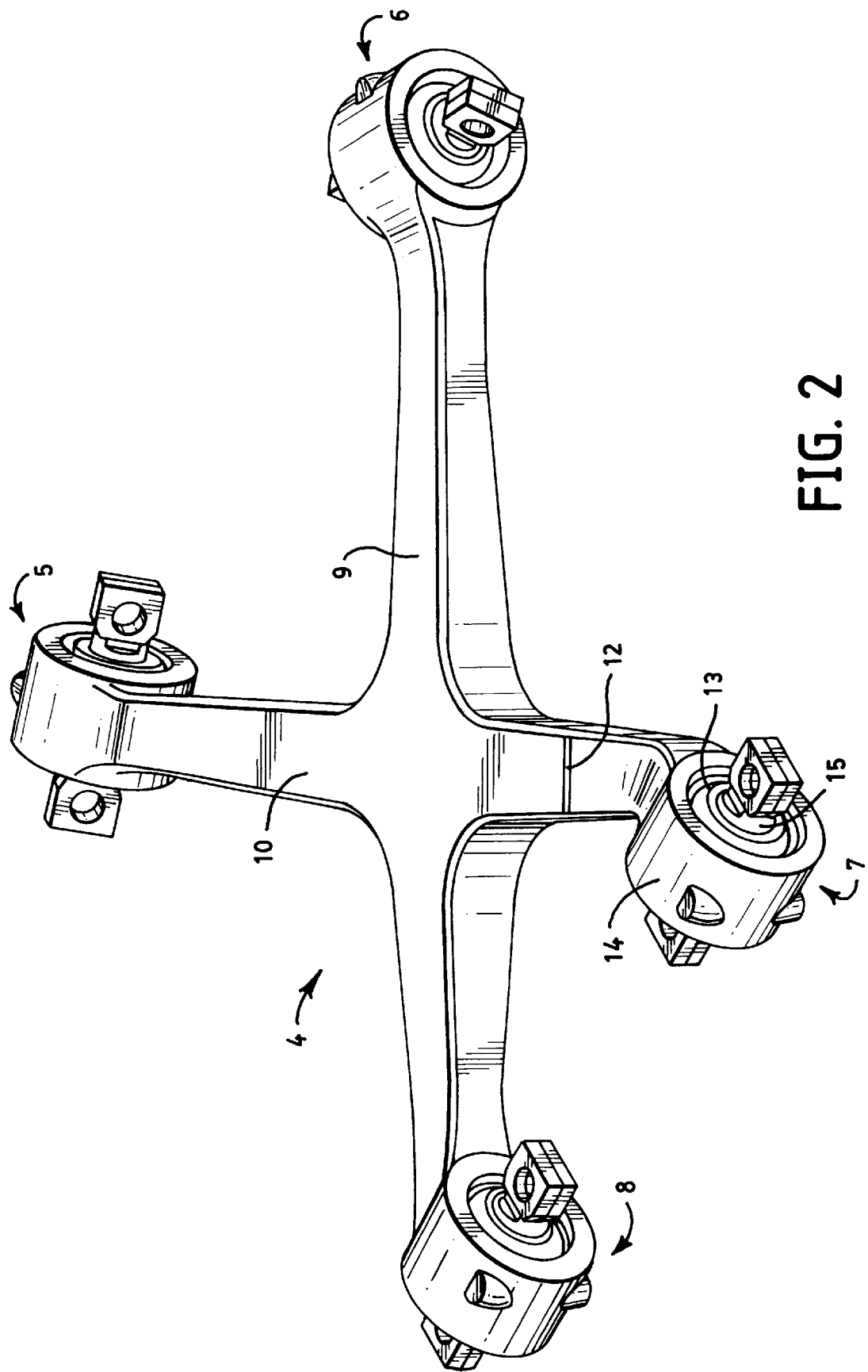
FIG. 2 is a three-dimensional representation of a four-point connecting rod.

The arms 9 and 10 can be fastened to the vehicle body via the body joints 5 and 6, and they are fastened with the axle joints 7 and 8 arranged at the other ends of the arms 9 and 10 to the vehicle axle 1 or to a support body 1.1, which is connected to the vehicle axle 1. This design of the four-point connecting element 4 counteracts rolling movements of the vehicle axle 1. The torsion of the four-point connecting element that occurs during rolling movements causes restoring forces for restoring the zero roll position due to torsional stresses. FIG. 2 shows a three-dimensional view of the X-shaped four-point connecting element according to the present invention. The joints 5 and 6 for fastening to the body and the joints 7 and 8 for fastening to the vehicle axle 1 are arranged at the ends of the arms of the X-shaped cross. A predetermined breaking point 12 is recognizable on the arm 10 in the embodiment according to FIG. 2.

The cross-sectional profile of the arms is approximately rectangular in this example, as is also indicated in the drawing figure. Various materials may be used.

The four-point connecting rod 4 has the two stable articulated arms 9 and 10 firmly connected to one another by a stabilizing means subject to a defined characteristic curve. A framework construction is formed from the articulated arms 9 and 10 with the stabilizing means. The dynamometric course within the plane load-bearing structure can be determined exactly in this case, so that a structural design that is adapted exactly to the load conditions is possible.

The cross-sectional profile of the arms is adapted to the structural conditions and may have, e.g., a double-T or I shape, or it may comprise a hollow profile. Various materials can be used for this.

The above-mentioned features of the present invention and the features yet to be explained may, of course, be used not only in the combination described, but also in combinations or alone without leaving the scope of the present invention.

While specific embodiments of the invention have been shown and described in detail to illustrate the application of the principles of the invention, it will be understood that the invention may be embodied otherwise without departing from such principles.

| LIST OF REFERENCE NUMBERS | |
|---|---|
| 1 | Vehicle axle |
| 1.1 | Support body |
| 2 | Longitudinal control rod |
| 3 | Longitudinal control rod |
| 4 | Four-point connecting rod |
| 5 | Joint |
| 6 | Joint |
| 7 | Joint |
| 8 | Joint |
| 9 | Arm |
| 10 | Arm |
| 11 | Vehicle body |
| 12 | Predetermined breaking point |

What is claimed is:

1. An axle suspension for a rigid axle in a vehicle, the suspension comprising:

first and second longitudinal connecting rods connecting the axle of the vehicle with a vehicle body in a vertically movable manner, said first and second longitudinal connecting rods extending in a longitudinal direction of the vehicle and being arranged on either side of the vehicle;

a torsional connecting element including first and second body joints pivotally connecting said torsional connecting element to the vehicle, said first and second body joints being spaced apart from one another in a transverse direction of the vehicle, said torsional connecting element including first and second axle joints pivotally connecting said torsional connecting element to the axle, said first and second axle joints being spaced apart from one another in a transverse direction of the vehicle, said first body and axle joints being positioned on a first side of the vehicle, and said second body and axle joints being positioned on a second side of the vehicle, said first and second sides of the vehicle being diametrically opposite, said torsional connecting element including a first arm with one end connected to said first body joint and another end connected to said second axle joint, said torsional connecting element including a second arm with one end connected to said second body joint and another end connected to said first axle joint.

2. An axle suspension in accordance with claim 1, wherein:

said torsional connecting element includes stabilizing means for actively opposing lateral rolling and tilting motions by means of torsional stresses, said stabilizing means being formed by a connection of said first and second arms and by a shape and material of said arms.

3. An axle suspension in accordance with claim 2, wherein:

said first and second arms, and said connection of said first and second arms being formed as a single one piece homogenous unit to form said torsional connecting element.

4. An axle suspension in accordance with claim 3, wherein:

said first and second arms, and said connection of said first and second arms being formed as a single casting.

5. An axle suspension in accordance with claim 3, wherein:

said first and second arms, and said connection of said first and second arms being formed as a single forged part.

6. An axle suspension in accordance with claim 2, wherein:

said stabilizing means provides a stabilizing torque of between 10 and 60 kNm about a longitudinal axis of the vehicle.

7. An axle suspension in accordance with claim 2, wherein:

a center of rotation of said torsional connecting element corresponds to a crossing position of said first and second arms, said center of rotation being positioned to achieve a passive roll steer effect in the vehicle.

8. An axle suspension in accordance with claim 2, wherein:

said one of said arms includes a predetermined breaking point spaced from said connection of said arms.

9. An axle suspension in accordance with claim 2, wherein:

said joints and said torsional connecting element form a modular system with individual parts that can be interchanged corresponding to loads.

10. An axle suspension in accordance with claim 1, wherein:

said body and axle joints are molecular ball joints with an elastomer arranged between a joint housing and a ball piece;

said longitudinal connecting rods pivotally connect the axle to the vehicle about a transverse axis of the vehicle;

said axle joints are connected to the axle at a position vertically spaced from a connection of said longitudinal connecting rods to the axle;

said first and second arms have substantially rectangular cross sections.

11. An axle suspension in accordance with claim 1, wherein:

a distance between said body joints is between 300 and 700 mm.

12. An axle suspension in accordance with claim 1, wherein:

a distance between said axle joints is between 300 and 700 mm;

a distance between said body joints is between 300 and 700 mm.

13. An axle suspension in accordance with claim 1, wherein:

a distance between said axle joints is substantially 350 mm;

a distance between said body joints is substantially 500 mm.

14. An axle suspension in accordance with claim 1, wherein:

a distance between said axle joints and said body joints is between 300 and 1,000 mm.

15. An axle suspension for a rigid axle in a vehicle, the suspension comprising:

longitudinal connecting rods connecting the axle of the vehicle with a vehicle body in a vertically movable manner, said longitudinal connecting rods extending in a longitudinal direction of the vehicle and being arranged on either side of the vehicle;

a torsional connecting element including first and second body joints pivotally connecting said torsional connecting element to the vehicle, said first and second body joints being spaced apart from one another in a transverse direction of the vehicle, said torsional connecting element including first and second axle joints pivotally connecting said torsional connecting element to the axle, said first and second axle joints being spaced apart from one another in a transverse direction of the vehicle, said first body and axle joints being positioned on a first side of the vehicle, and said second body and axle joints being positioned on a second side of the vehicle, said first and second sides of the vehicle being diametrically opposite, said torsional connecting element including first and second arms, each of said first and second arms having one end connected to one of said body joints and another end connected to one of said axle joints, said torsional connecting element includes stabilizing means for actively opposing lateral rolling by means of torsional stresses, said stabilizing means being formed by said first and second arms being formed in one piece, and by a shape and material of said arms, said first arm having said one end connected to said first body joint and said another end connected to said second axle joint, said second arm has said one end connected to said second body joint and said another end connected to said first axle joint.

16. An axle suspension in accordance with claim 15, wherein:

said first and second arms have a connection between them;

said first and second arms, and said connection between said first and second arms are formed as a single casting.

17. An axle suspension in accordance with claim 15, wherein:

said first and second arms have a connection between them;

said first and second arms, and said connection between said first and second arms are formed as a single forged part.

18. An axle suspension in accordance with claim 15, wherein:

said stabilizing means provides a stabilizing torque of between 10 and 60 kNm about a longitudinal axis of the vehicle.

19. An axle suspension in accordance with claim 15, wherein:

a center of rotation of said torsional connecting element corresponds to a crossing position of said first and second arms, said center of rotation being positioned to achieve a passive roll steer effect in the vehicle.

* * * * *